(12) United States Patent
Miglautsch (10) Patent No.: US 6,993,489 B1
(45) Date of Patent: Jan. 31, 2006

(54) METHOD FOR AUTOMATED ELECTRONIC MAIL COMMUNICATION

(76) Inventor: John R Miglautsch, N57 W.30470 Hwy. K, Hartland, WI (US) 53029

( * ) Notice: Subject to any disclaimer, the term of this patent is extended or adjusted under 35 U.S.C. 154(b) by 571 days.

(21) Appl. No.: 09/657,071

(22) Filed: Sep. 7, 2000

(51) Int. Cl.
*G06F 17/60* (2006.01)
(52) U.S. Cl. ........................................................ 705/1
(58) Field of Classification Search ..................... 705/1
See application file for complete search history.

(56) References Cited

U.S. PATENT DOCUMENTS

| | | | |
|---|---|---|---|
| 5,446,919 A | 8/1995 | Wilkins | 455/6.2 |
| 5,537,314 A | 7/1996 | Kanter | 364/406 |
| 5,548,753 A | 8/1996 | Linstead et al. | 395/600 |
| 5,675,662 A | 10/1997 | Deaton et al. | 382/137 |
| 5,819,285 A * | 10/1998 | Damico et al. | 707/104.1 |
| 5,956,693 A | 9/1999 | Geerlings | 705/14 |
| 6,029,141 A * | 2/2000 | Bezos et al. | 705/27 |
| 6,101,486 A * | 8/2000 | Roberts et al. | 705/27 |
| 6,327,572 B1 * | 12/2001 | Morton et al. | |
| 6,334,142 B1 * | 12/2001 | Newton et al. | 709/206 |

(Continued)

FOREIGN PATENT DOCUMENTS

WO   WO 200025244 A1 * 5/2000

OTHER PUBLICATIONS

"As Membership Soars to 7.5 Million, Lifeminders.com Credits Almost 2 Million to Viral Marketing." PR Newswire, Jan. 18, 2000.*

(Continued)

*Primary Examiner*—John Weiss

*Assistant Examiner*—Jonathan Ouellette (74) *Attorney, Agent, or Firm*—Andrus, Sceales, Starke & Sawall, LLP (57) ABSTRACT

A method of controlling the automated electronic communication between a host database and a prospect that was referred to the database by a sponsor. Initially, a sponsor accesses the host database and answers survey questions related to the sponsor and additional survey questions about each of the prospects being referred to the host database. Based upon the information received about each of the prospects from the sponsor, the host database generates a message template that is delivered electronically to the sponsor. After receiving the message template, the sponsor forwards the message to the prospect such that the prospect believes that the message has been originated directly from the sponsor, rather than the host database. The message template sent to the prospect from the sponsor includes an electronic link to a customized web page generated by the host database. The customized web page is created based upon the information received about the prospect from the sponsor. Based upon the information about the prospect, the web page is created containing information relevant to the prospect. Upon accessing the web page, the prospect is asked if they would like to receive further information. If further information is required, the host database again generates a message template that is sent to the sponsor for forwarding onto the prospect. The method of automated electronic communication allows the host database to generate messages that are first sent to the sponsor prior to their receipt by the prospect.

11 Claims, 4 Drawing Sheets

U.S. PATENT DOCUMENTS

| | | | |
|---|---|---|---|
| 6,405,175 B1 * | 6/2002 | Ng | 705/14 |
| 6,446,044 B1 * | 9/2002 | Luth et al. | 705/14 |
| 6,629,135 B1 * | 9/2003 | Ross et al. | 709/218 |
| 2001/0020231 A1 * | 9/2001 | Perri et al. | 705/14 |
| 2001/0051876 A1 * | 12/2001 | Seigel et al. | 705/1 |
| 2002/0049816 A1 * | 4/2002 | Costin et al. | 709/206 |
| 2002/0174010 A1 * | 11/2002 | Rice, III | 705/14 |
| 2003/0088465 A1 * | 5/2003 | Monteverde | 705/14 |
| 2003/0191816 A1 * | 10/2003 | Landress et al. | 709/219 |

OTHER PUBLICATIONS

"Proflowers.com to use MegaChain.com's Referral Email Marketing Service." Business Wire, Sep. 21, 1999.*

"Advertisers and E-mail Users Unite for Cash Rewards," Business Wire, Nov. 23, 1999.*

"Digital Impact Introduces Forward to a Friend, a Powerful Viral Marketing Application for Expanding Opt-in email Lists," Business Wire, Jan. 14, 2000.*

Foster, Ed, "The Grape Vine: Viral marketing goes one step too far—to a place where friends spam friends." InfoWorld, Feb. 7, 2000.*

Beeler, Amanda, "Virus without a cure; Word-of-mouth pitches mutate into new forms on the Internet." Advertising Age, v71, p54, Apr. 17, 2000.*

"PlanetFeedback.com Spearheads New Viral Consumer Consortium; Research Effort First Step Toward Group Targeting Corporate, CRM, Marketing, Academeic Thought-Leaders." Business Wire, May 9, 2000.*

Bannan, Karen J., "It's Catching." Brandweek, Jun. 5, 2000.*

* cited by examiner

Fig. 2

METHOD FOR AUTOMATED ELECTRONIC MAIL COMMUNICATION

BACKGROUND OF THE INVENTION

The present invention generally relates to a method of electronic communication between a group of participants. More specifically, the present invention relates to a method of automated electronic communication between a host database and a prospective participant that was referred to the database by a sponsor such that the host database shapes and tracks communication between the sponsor and the prospect.

Presently, electronic communication, such as email and active websites, is becoming an ever-increasingly popular method to communicate between two parties over a global computer network, such as the internet. Email allows a single individual, or host, to simultaneously and easily contact a large number of recipients to deliver either a common message or specialized messages to each of the individual recipients. Electronic commerce, or e-commerce websites allow individual consumers connected to the internet to remotely access the website and place an order for numerous types of goods and services. Although e-commerce websites are convenient and popular, these e-commerce websites face the common challenge of attracting prospective clients or customers to the website. One common method of attracting potential consumers is through the use of various types of advertising, either through conventional advertising channels or by placing electronic ads on popular websites that are accessed by a large number of people. Although on-line advertising provides a means to attract potential consumers, the e-commerce site has no way of contacting the prospective customer until the prospective customer positively acts to access the on-line e-commerce website.

Another current method of attracting potential prospects is through the use of generic email messages that are broadcast to a list of prospective customers oftentimes obtained from a direct marketer or other compiled list. This type of general broadcast email, often referred to as spam, oftentimes results in a negative reaction by the recipient of the message since the recipient realizes that they are being contacted by a some distant corporation that purchased the potential consumer's email address.

Yet another method of attracting potential consumers to an e-commerce website is through the use of a multi-level marketing (MLM) organization that includes sponsors that receive a monetary reward for successfully referring people to the host website. For example, some e-commerce websites grant a $1.00 reward to a sponsor for each prospect that was referred to the website by the sponsor. Further, many multi-level marketing organizations reward the sponsor with a percentage of the money spent by the prospect at the host's e-commerce website.

In a multi-level marketing organization, it is important for the sponsor to monitor their prospects in order to ensure that the prospects are kept happy and continue to visit the e-commerce website. However, many individual sponsors in multi-level marketing organizations either forget to contact their prospects, because of the large number of prospects referred by the sponsor or a lack of organization skills by the sponsor, fail to recognize that follow-up messages to their downstream prospects aid in spurring the prospect into further activity on the e-commerce website.

In addition to multi-level marketing organizations, many charitable and political organizations request their members to provide additional potential contacts that the charitable or political organization can contact in hopes of raising additional funding for the organization. Again, sponsors are often forgetful in following-up with the potential contacts, are uncomfortable with preparing the messages, or do not wish to spend the time required to prepare and compose follow-up letters and monitor the status of the relationship between the sponsor and the potential prospects.

Therefore, a need exists for an automated electronic communication system that assists the communication between a sponsor and a prospect. Further, a need exists for an automated electronic communication system in which a host database contacts a prospect through the sponsor such that the prospect receives the message from the sponsor rather than from than the host database. Another object of the present invention to provide a communication system in which the timing of the messages to a prospect is controlled by the host database and the host database prompts the sponsor to send personalized messages to the prospect. It is an additional object of the present invention to provide a personalized website and messages to the prospect based on information received about the prospect from the sponsor. In this manner, the messages and the website seen by the prospect are tailored to personal interests and characteristics of the prospects, leading to a more effective marketing method.

SUMMARY OF THE INVENTION

The present invention is a method and system for controlling the electronic communication between a host database or website and a prospect that has been referred to a database by a sponsor. The present invention is particularly applicable to a multi-level marketing organization that is associated with an e-commerce website. However, the method and system of the present invention can also be utilized in connection with a charitable organization, political organization or other organization attempting to recruit additional members while keeping track of and assisting the communication between the new members and their sponsoring party.

In accordance with the present invention, the sponsor initially accesses the host database associated with the sponsoring organization and is prompted with a survey asking the sponsor a series of somewhat personal yet relatively general questions concerning the lifestyle of the sponsor. After the sponsor has answered the survey questions from the host database, the sponsor information is stored in the host database for future use. The sponsor information is utilized by the host database to personalize communication between the host database and the sponsor.

After the sponsor has answered survey questions concerning personal characteristics of the sponsor, the sponsor is prompted to provide an email address for a prospect that the sponsor would like to refer to the host database. Once the email address has been entered by the sponsor, the sponsor is presented with an on-line survey asking somewhat personal yet relatively general questions about the specific prospect. The survey questions about the prospect include common types of information that a person living near the prospect would generally know. Once the survey questions about the prospect have been answered by the sponsor, the prospect information is entered into the host database for use in personalizing messages and web pages that are created specifically for the prospect.

After the survey questions have been answered for each of the prospects, the host database creates a message template based on the prospect information. The message template is forwarded to the sponsor so that the sponsor can revise the message template based upon personal preferences of the sponsor. Typically, the message template includes a core message that the sponsoring organization wishes to relay to the prospect. The core message can be personalized by the sponsor.

In addition to creating the message template, the host database creates a customized web page based upon the prospect information received from the sponsor. The personalized web page is tailored to highlight and focus on personal characteristics of the prospect to which the message template will be sent. An electronic link to the personalized web page is attached to the message template prior to the message template being sent to the sponsor.

After the sponsor has revised and personalized the message template, the sponsor forwards the personalized message template to the prospect. Since the prospect receives the message template directly from the sponsor, the prospect is led to believe that the email message originated from the sponsor, rather than from the host database. In this manner, the prospect feels that he or she is being contacted directly by their friend or family member, rather than the impersonal host database.

Upon receipt of the email message from the sponsor, the prospect is asked whether or not he or she is interested in the information contained within the email message. If the prospect indicates that he or she is interested in the information, an electronic link transfers the sponsor to the personalized web page created by the host database. Once the prospect accesses the web page, the prospect is presented with further information and prompted as to whether the prospect would like to receive further information concerning the topic. If the prospect indicates they would like to receive further information, the host database generates another message template which is forwarded to the sponsor. Again, the sponsor can personalize the message template and forward it to the prospect, leading the prospect to believe that the message originated from the sponsor, rather than the host database.

If the prospect indicates no interest in the subject matter of the original email message, the prospect is directed to a second personalized web page providing the prospect with further information and inquiring as to whether or not the prospect is now interested. If the prospect now indicates an interest, an email and message template are sent to the sponsor, who can then personalize and forward the message to the prospect.

As discussed above, the information received by the host database about each of the prospects is used by the host database to create the individual message templates that are sent to the sponsor prior to the sponsor personalizing and forwarding the message to the prospect. In addition, the information received about each of the prospects is used by the host database to analyze the effectiveness of the message on different types of recipients. For example, the host database can track the number of prospects that respond positively to the received messages and analyze these results based upon the information the database already knows about the prospect. For example, the host database may determine that the generic message being sent to each of the prospects is very effective with older persons having no children and owning their own home while the message is much less effective with young parents who are currently renting their home. Based upon this analyzed data, the host database can readjust the generic messages to those groups of individuals to which the message is proving less effective.

The automated electronic communication system of the present invention also allows the host database to control follow-up messages from the sponsor to the prospect. Initially, the sponsor enters important dates in the prospect's life into the host database. When any one of these dates approaches, the host database sends a reminder message to the sponsor. Upon receiving the reminder message, the sponsor can forward the follow-up or reminder message to the prospect. Once again, the prospect is led to believe that the message was created by the sponsor, rather than the host computer database.

The communication system and method of the present invention is particularly applicable to multi-level marketing organizations which require individual members to refer others to the organization. Additionally, the method and system of the present invention can be utilized in other types of organizations, such as charitable organizations, political organizations and any other type of organization that wishes to attract new members and reward other members for referring the new prospects to the organization.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
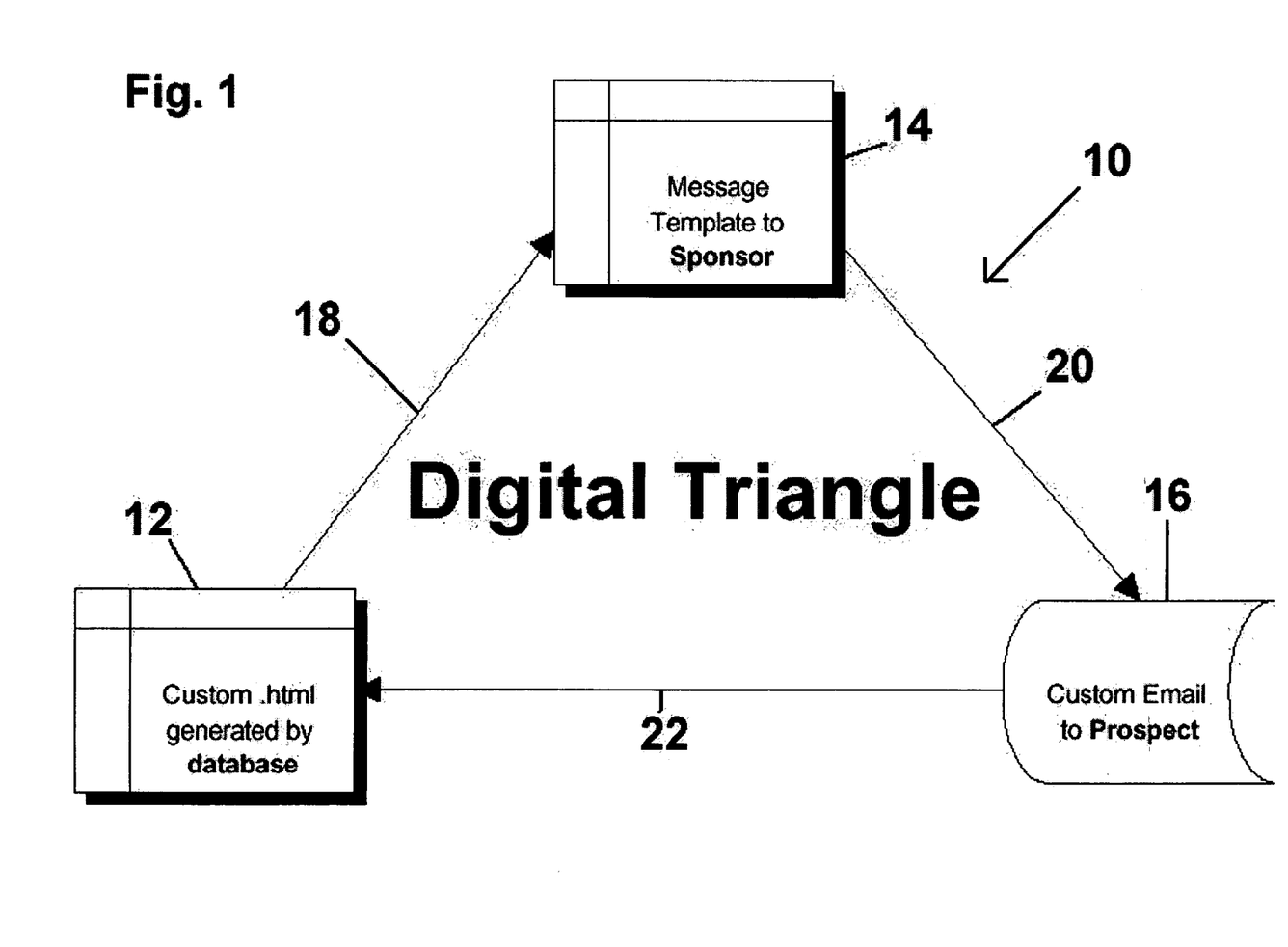
FIG. 1 is a schematic illustration of the electronic flow of information and messages between a host database, a sponsor and a prospect referred to the database by the sponsor.

Referring first to FIG. 1, thereshown are the three basic components of an automated electronic communication loop 10, referred to as a "digital triangle", that includes a host database 12, a sponsor 14 and a prospect 16. In the embodiment of the invention illustrated in FIG. 1, the host database 12 is an on-line, web-based computer that is connected to a global computer network, such as the internet, to provide both a plurality of web pages accessible over the internet and the ability to receive and send email messages over a global computer network, such as the internet. Specifically, the host database is contemplated as being able to perform numerous types of applications and is operated by various entities, such as an e-commerce site in a multi-level marketing organization, a charitable organization, a fund-raising organization, a political organization, a salesman having a large number of leads, or any other type of organization or commercial application that wishes to spur and track the electronic communication between a sponsor 14 and a prospect 16.

Although only a single sponsor 14 is illustrated in FIG. 1, it should be understood that in most organizations, and specifically multi-level marketing organizations, numerous sponsors exist that each would communicate back to the single host database 12. Likewise, although only a single prospect 16 is shown for the sponsor 14, it is expected that the sponsor 14 would be responsible for a plurality of individual prospects 16, although only a single prospect is illustrated in FIG. 1.

Figure 2:
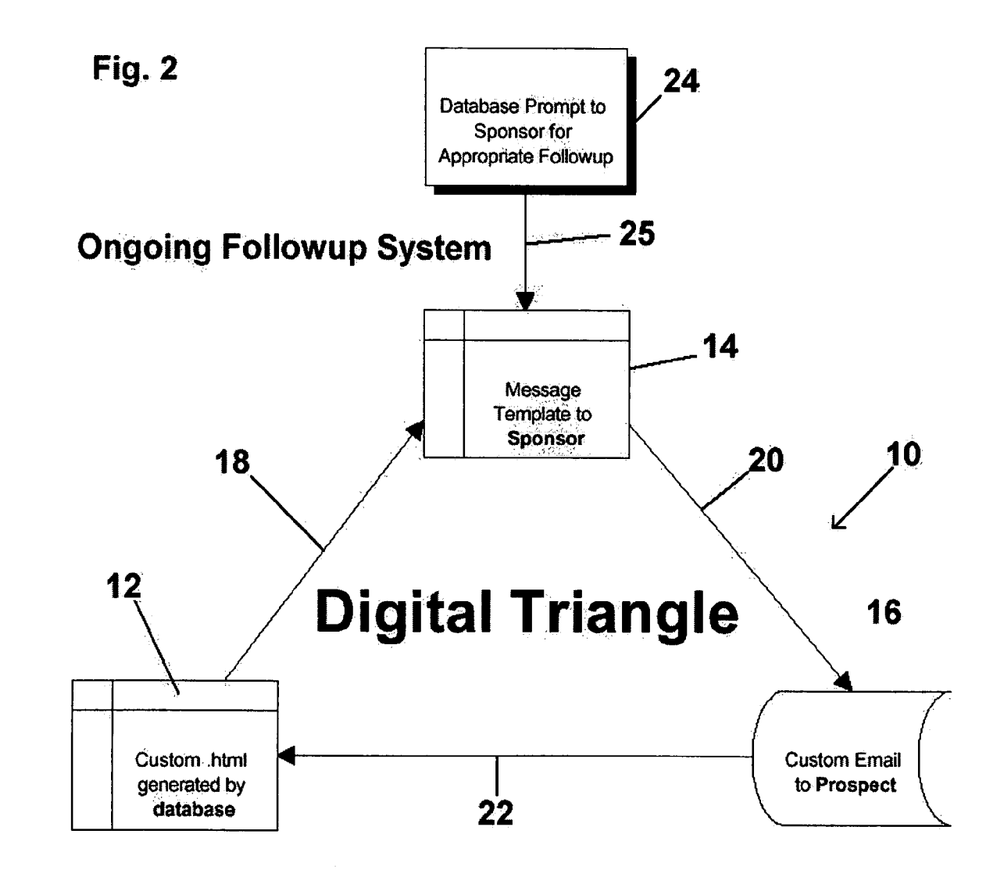
FIG. 2 is a schematic illustration of the interaction between the host database, the sponsor and the prospect further illustrating the prompt from the host database to the sponsor to initiate contact with the prospect.

Referring now to FIGS. 1 and 2, the host database 12 generates a message template that is sent to the sponsor 14, as illustrated by arrow 18. The message template sent to the sponsor includes a core communication message that conveys a specified message to the prospect. However, the message template includes optional phrases that the sponsor can select to allow the sponsor to configure the message into his or her own words. The customization of the message template by the sponsor 14 allows the sponsor 14 to tailor the email message to be clear yet personalized in a way that connects with the prospect 16. Listed below is a sample of a message template sent by the host database to the sponsor for customization.

Dear (name),
You are one of just a handful of friends/relatives/colleagues I am getting a hold of. As one of my friends/relatives/colleagues, I wanted you to be part of an internet business/fund raising opportunity/political network we are building together. Are you curious? Yes No As illustrated above, the message template allows the sponsor to choose between one of several alternate selections based upon the specific prospect to which the message is being sent. Additionally, it is clear that the message template can be used in many types of situations, such as an e-commerce website, fund raising organization or political network.

Once the sponsor 14 has configured the message template to be customized for the prospect, the email message is sent to the prospect as illustrated by arrow 20 in FIG. 1. An important point to note is that the email message sent between the sponsor and the prospect is personalized by the sponsor and appears to have been generated by the sponsor, rather than the host database 12. Specifically, the email message from the sponsor to the prospect will indicate that the message originated from the sponsor and will include no indication that the message was actually initiated by the host database 12. Thus, when the prospect receives the customized message from the sponsor, the prospect will be unaware that the message was originally a generic message created by the host database 12.

The custom email message received by the prospect 16 prompts the prospect as to whether the prospect is interested in a particular topic or offer. In the email message, an electronic link to a custom-generated web page is included with the email message. From the email message, the sponsor is able to choose "yes" or "no" as to whether he or she is interested in the information included in the email message.

If the prospect indicates that he or she is interested in the information or opportunity mentioned in the email message, the prospect is taken to a web page that is customized based upon personal information concerning the specific prospect that was input into the database 12 by the sponsor, in the manner to be described below. Once the prospect accesses the website created by the host database 12, the prospect is automatically prompted with various questions and information generated by the host database 12. In a multi-level marketing system, the prospect is given identification that indicates that the prospect was referred to the host database 12 by the sponsor 14 such that the sponsor 14 can be rewarded based upon the multi-level marketing scheme.

If the prospect chooses "no" in the customized email received from the sponsor, the browser on the prospect's computer takes the prospect to an alternate web page generated by the host database 12. The alternate web page generated by the host database 12 contains further questions for the prospect to determine what the prospect is interested in and how the sponsoring organization could meet the needs of the prospect. In this manner, the host database 12 can monitor whether the prospect referred by the sponsor 14 is interested in the program being offered such that the host database 12 can provide additional information to the prospect without requiring interaction from the sponsor 14.

Referring now to FIG. 2, the communication loop 10 further includes a follow-up function 24 that is generated by the host database 12 to remind the sponsor 14 to follow-up with the prospect 16. The database prompt sent to the sponsor 14, as illustrated by arrow 25, reminds the sponsor to follow-up with the prospect. As described above, the follow-up message is then customized by the sponsor and ultimately generated by the sponsor 14 and transmitted to the prospect 16 as illustrated by arrow 20. The follow-up message generated by the sponsor 14 appears to have come from the sponsor 14 rather than the host database 12. Again, the prospect is unaware that the messages being received are actually generated by the host database and are not created by the sponsor 14. In this manner, the host database 12 is able to control the timing of the follow-up to the prospect while the prospect receives the follow-up from the sponsor, rather than from the impersonal host database 12.

In addition to following-up with each prospect, the host database 12 is able to prompt the sponsor to send periodic reminders and well wishes to the prospect. For example, the database 12 can prompt the sponsor 14 to send birthday messages, anniversary congratulations and other somewhat personalized messages to the prospect 16. Since the host database 12 first sends a reminder message template to the sponsor 14, the sponsor 14 is able to personalize the message and keep in contact with the prospect without having to remember important dates and when to contact the prospect 16.

As described above, the communication loop 10 between the host database 12, the sponsor 14 and the prospect 16 allows the host database 12 to control the communication between the sponsor 14 and the prospect 16 while maintaining the appearance that the messages being sent to the prospect are generated by the sponsor 14. As discussed previously, the messages sent to the prospect are personalized by the sponsor and the web page generated by the host database that is accessed by the prospect is personalized based upon information entered into the host database 12 by the sponsor 14. The set-up and development of the host database 12 for both the sponsor 14 and the prospect 16 are illustrated by the flowchart of FIG. 3.

Figure 3:
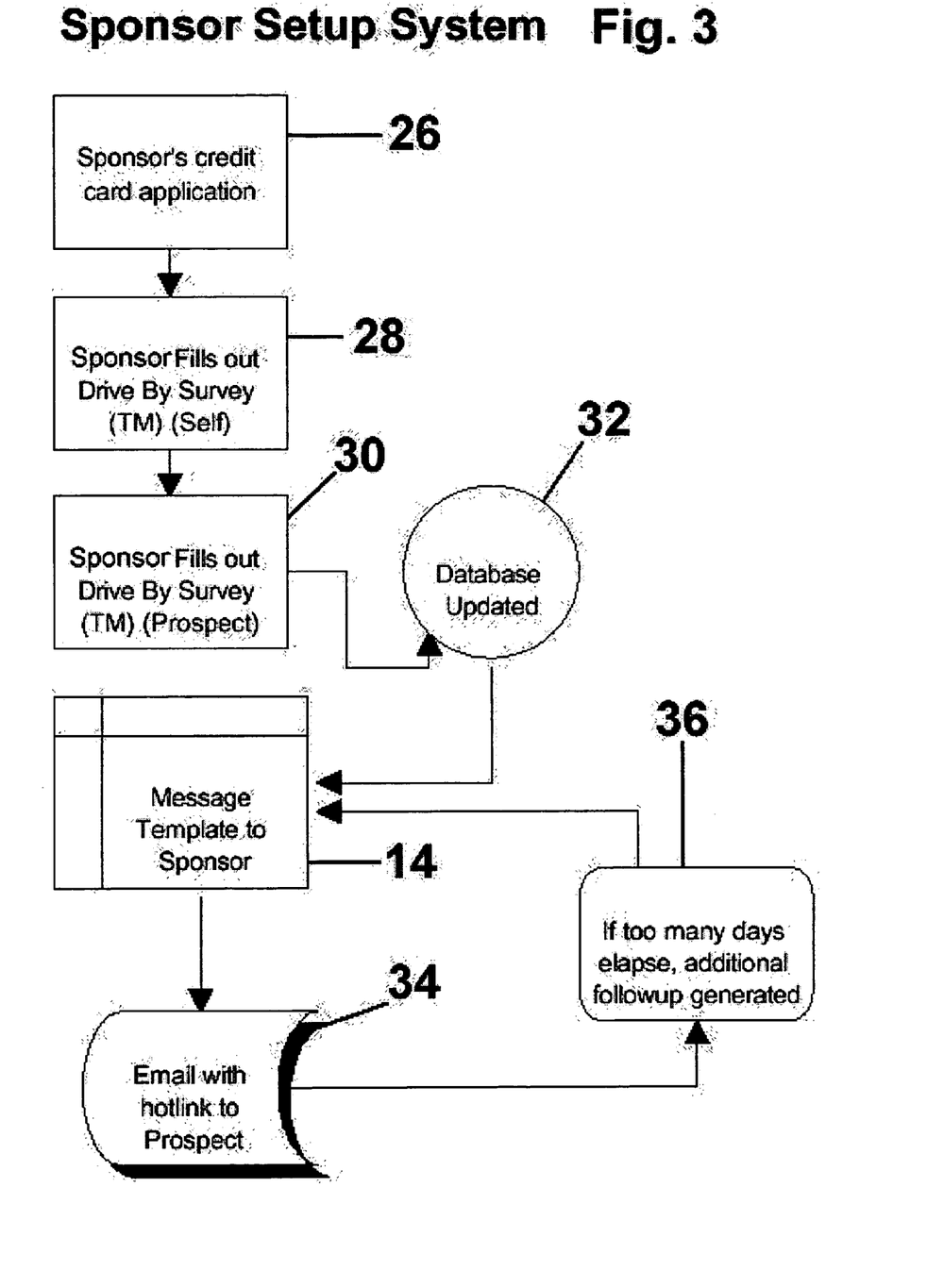
FIG. 3 is a flowchart illustrating the sequential steps used by the host database to control the set-up of a sponsor.

Referring now to FIG. 3, the first step in setting up sponsor information within the host database 12 is obtaining a credit card information from the sponsor, as illustrated in step 26. The sponsors credit card allows the host database to change the sponsor for the process of the invention and other charges associated with the operation of the host database.

After the sponsor has set up a credit card application, the website prompts the sponsor to fill out a survey about himself. The survey is referred to as a "drive-by survey" since the questions asked during the on-line survey are brief in nature and are questions that anyone in the sponsors neighborhood would readily know. For example, the survey asks the sponsor whether they are young/middle/older, rich/middle/poor, big/middle/small house, young/old/gone/no kids and other similar questions. The survey questions and answers allow the host database to set up a general profile for the sponsor. The sponsor profile is used by the host database to tailor the message template sent by the host database to the sponsor, which will then be eventually forwarded to the prospect.

After the sponsor has filled out a survey for himself, the sponsor is prompted to provide an email address and fill out a survey for each of the prospects that the sponsor is referring to the host database. The survey filled out by the sponsor about the prospect is also a "drive-by survey" similar in nature to the survey the sponsor filled out. The survey asks basic questions that anyone in the prospect's neighborhood would know about the prospect. By limiting the survey to generalized questions, the sponsor is given a feeling that he or she is not giving out personal information that the prospect would not want the host database to know. Yet, the survey questions are in sufficient detail such that the host database can generate meaningful message templates based upon the information received.

In addition to utilizing the information received in response to the survey questions to generate a meaningful message template, the host database also develops a profile for each of the prospects based upon the answers to the survey questions. The profile for each of the prospects can be used by the database to determine which group of prospects is responding in the most positive manner to the subject matter of the message template. After analyzing the number of positive responses for each prospect, the host database can develop a profile indicating which groups of people are responding more positively and which groups of people are responding more negatively. For example, the host database may determine that older individuals who are homeowners are responding more positively while younger individuals who rent homes are responding more negatively to the information contained within the message template. Based upon this information, the host database can alert the sponsoring organization of this trend, which may cause the sponsoring organization to reevaluate the message being sent.

After the sponsor has filled out the survey for the prospect, the host database is updated as illustrated in step 32. Once updated, the host database generates the message template 14 which is sent to the sponsor. The message template, as discussed previously, relays a core message to the prospect but can be tailored by optional phrases such that the message appears to have been generated by the sponsor, rather than the host database.

After the message has been tailored by the sponsor, the message is emailed with a hotlink from the sponsor to the prospect, as illustrated in step 34. As discussed previously, the hotlink attached to the email directs the prospect to a web page that is specifically developed based upon the characteristics of the prospect that were entered into the host database by the sponsor filling out the survey, as indicated by step 32.

After the email has been sent to the prospect, the host database monitors how long it takes from delivery of the email message to the prospect until the prospect accesses the web page linked to the email message. If a predetermined number of days pass, the host database generates a follow-up message, as illustrated by step 36. The follow-up message is again sent to the sponsor as a message template, which the sponsor then forwards to the prospect. Since the message from the sponsor to the prospect does not identify the host database, the prospect is led to believe that the message has been generated by the sponsor.

Although step 36 is shown as providing a reminder if a period of time expires after the prospect receives the initial email, the host database can also be programmed to send a message template to the sponsor at various other times, such as a reminder of the prospect's birthday or wedding anniversary. These specific dates are entered into the host database by the sponsor. Thus, the host database can prompt the sponsor to email the prospect at various times such that the sponsor can maintain an active relationship with the prospect through the help of the host database. Additionally, the host database can initiate contact with the prospect to reinforce product benefits, suggest training seminar tapes or books or provide other selected information to the prospect.

Figure 4:
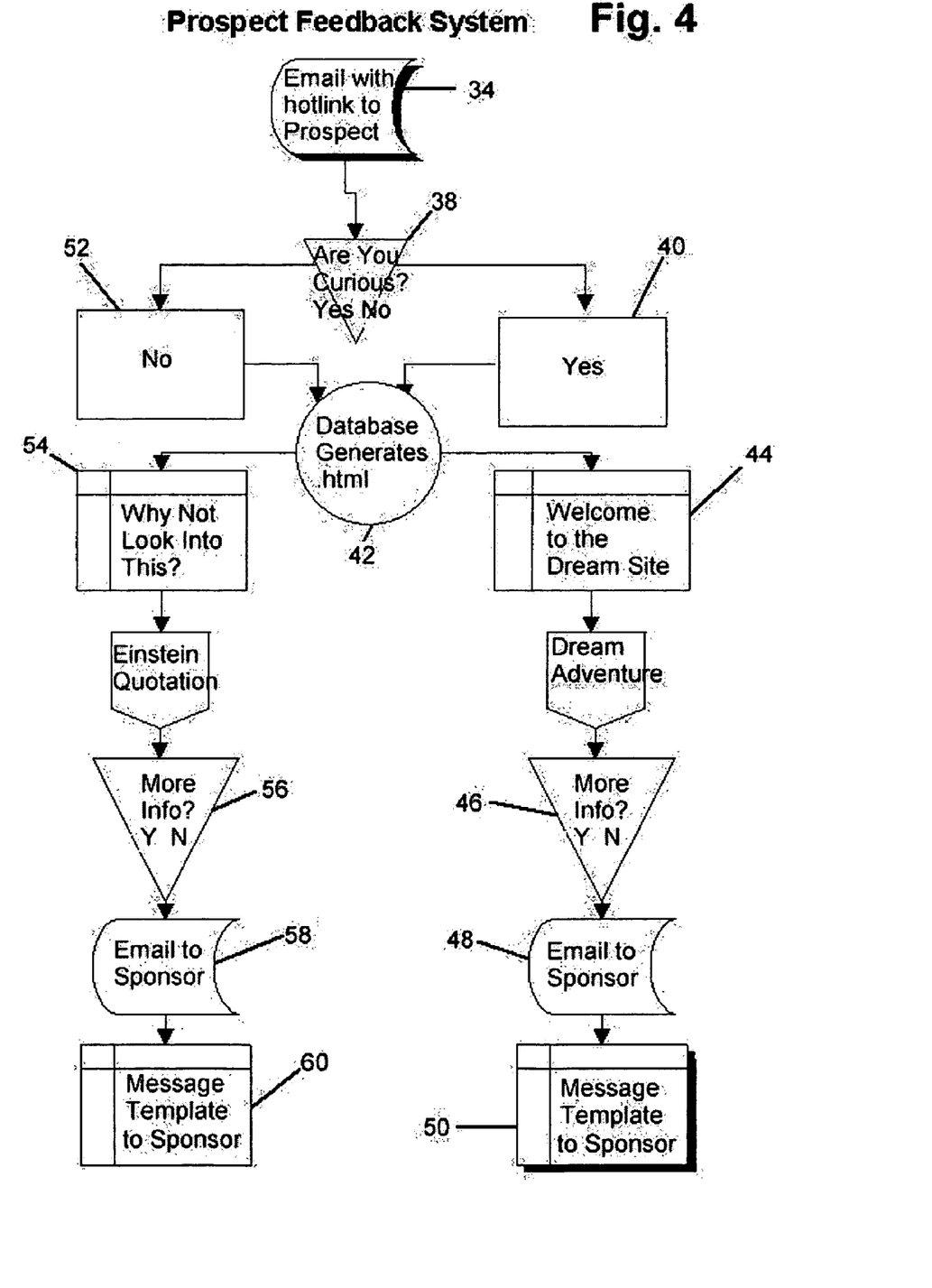
FIG. 4 is a flowchart illustrating the operational sequence of the host database in responding to the decision by the prospect as to whether the prospect is interested in the message from the sponsor.

Referring now to FIG. 4, thereshown is the operational sequence that occurs once the prospect receives the initial email from the sponsor, as illustrated in step 34. Typically, the email will include a basic message relative to the subject matter of the host database and will terminate with a question asking the prospect whether the prospect is curious about the information presented in the email, as illustrated in step 38. If the prospect indicates that he or she is interested in the information contained within the email from the sponsor, the prospect answers "yes" in step 40 and the positive response is recorded in a database.

After the database has been updated, the internet browser on the prospect's computer is directed to a customized web page 44 created by the host database, as illustrated in step 42. The customized web page 44 created by the host database is created based upon the prospect information entered into the host database by the sponsor during the initial survey (step 30) in FIG. 3. The customized web page viewed by the prospect is specifically tailored for the prospect and presents the prospect with information related to the host database.

Once on the web page, the prospect is asked if he would like to receive further information regarding this subject matter, as illustrated in step 46. If the prospect decides that he would like to receive further information regarding the topic, an additional email and message template are sent to the sponsor, as illustrated in steps 48 and 50. The email and message template 48 and 50 are generated by the host database and contain the information requested by the prospect. Upon receiving the email and message template, the sponsor can forward the message template to the prospect such that the prospect again believes that the message has originated from the sponsor, rather than the host database.

Referring back to step 38, if the prospect decides that he or she is not interested in the subject matter set forth in the email 34, the prospect can indicate such in step 52. If the prospect indicates that he or she is not interested, the host database generates a second custom web page 54, as illustrated in step 42. Again, the custom web page generated by the host database in step 42 is specifically tailored to the prospect based upon the information received about the prospect from the sponsor in the survey (step 30) completed in the sponsor set-up of FIG. 3. The custom web page generated by the host database in step 42 prompts the prospect as to why the prospect is not interested in the subject matter represented by the web page. Additionally, the prospect is asked if he or she would now like to receive additional information, as illustrated in step 56. Once again, if the prospect is interested in further information, an email 58 and a message template 60 are sent to the sponsor. Upon receiving the email from the host database, the sponsor can forward the message template to the prospect such that the prospect believes he or she is being contacted by the sponsor, rather than the host database.

After the prospect has indicated his or her interest or disinterest in the subject matter of the initial message, the host database can use the decision of the prospect to further analyze the effectiveness of the generic message being sent. For example, since each of the prospects has a profile contained within the host database created by the information entered into the host database by the sponsor, the host database can determine which specific groups of individuals are responding most positively to the subject matter of the generic messages. Based upon this information, the sponsoring organization can reanalyze the type of message being sent to certain groups of individuals and possibly adjust the message in hopes of receiving a more positive response. In this manner, the information stored in the host database about each prospect allows the host database to identify trends in the positive and negative contacts with the prospects. Based upon these trends, changes can be made to more effectively prompt prospects into becoming involved in the sponsoring organization.

Although the present invention has been described in detail as it applies to a multi-level marketing system, it is contemplated by the inventor that the electronic communication loop could be used equally well with other types of organizations, such as a charity or election commission. In a situation where the electronic communication loop is utilized with a political campaign or charity, the email messages being sent by the host database to the sponsor would request donations of time and money from the prospect to which the email message will be forwarded. As can be easily understood, an email message coming from a sponsor who is a friend or family member rather than from the charity or election commission itself may have a greater effect on a prospect.

Various alternatives and embodiments are contemplated as being within the scope of the following claims particularly pointing out and distinctly claiming the subject matter regarded as the invention.

I claim:

1. A method of automated electronic communication between a host database and a prospect referred to the database by a sponsor, the method comprising the steps of: requesting prospect information from the sponsor, the prospect information being requested by the host database and including the email address and additional personal characteristics of the prospect; receiving and storing the prospect information from the sponsor in the host database; automatically creating a personalized message for the prospect at the host database based upon the stored prospect information; electronically forwarding the personalized message from the host database to the sponsor; promoting the sponsor to forward the personalized message such that the personalized message is received by the prospect from the sponsor; automatically creating at least one follow-up message for the prospect at the host database based upon the stored prospect information; electronically forwarding the follow-up message to the sponsor at predetermined at times determined by the hose database based upon the stored prospect information; and prompting the sponsor to forward the follow-up message to the prospect such that the follow-up message is received by the prospect from the sponsor, such that the host database controls the timing of the contact between a sponsor and the prospect.

2. The method of claim 1 further comprising the steps of:
developing a personalized web page from the stored prospect information, the personalized web page being created based upon the personal characteristics of the prospect; and
attaching an electronic link to the personalized message prior to forwarding the personalized message to the sponsor, the electronic link directing the prospect to the personalized web page.

3. The method of claim 2 further comprising the steps of:
determining whether the prospect has accessed the personalized web page within a selected time period after receiving the personalized message from the sponsor; and
automatically creating a follow-up message and forwarding the follow-up message to the sponsor when the prospect has failed to access the personalized web page within the time period.

4. The method of claim 1, wherein the predetermined times for contact with the sponsor include special events for the prospect as determined by the host database from the prospect information stored in the host database.

5. The method of claim 1 further comprising the step of requesting sponsor information from the sponsor, the sponsor information being indicative of personal characteristics of the sponsor.

6. A method of automated electronic communication between a host database and a prospect referred to the database by a sponsor, the method comprising the steps of: requesting prospect information from the sponsor, the prospect information being requested by the host database and including the email address and additional personal characteristics of the prospect; receiving and storing the prospect information from the sponsor in the host database; creating a personalized message for the prospect at the host database from the stored prospect information; developing a personalized web page from the stored prospect information, the personalized web page being created upon the personal characteristics of the prospect; attaching an electronic link to the personalized message, the electronic link directing the prospect to the personalized web page; electronically forwarding the personalized message including the electronic link to the sponsor from the host database; prompting the sponsor to revise and forward the personalized message to the prospect, such that the personalized message is received by the prospect from the sponsor; automatically creating at least one follow-up message for the prospect at the host database based upon the stored prospect information; electronically forwarding the follow-up message to the sponsor at predetermined times determined by the host database based upon the stored prospect information; and prompting the sponsor to forward the follow-up message to the prospect such that the follow-up message is received by the prospect from the sponsor, such that the host database controls the timing of the contact between a sponsor and the prospect.

7. The method of claim 6 wherein the personalized message includes multiple message choices selectable by the sponsor prior to the sponsor forwarding the message to the prospect.

8. The method of claim 6 further comprising the steps of:
determining whether the prospect has accessed the personalized web page within a selected time period after the prospect receives the personalized message from the sponsor;

automatically creating a follow-up message when the prospect has failed to access the personalized web page within the selected time period; and prompting the sponsor to forward the follow-up message to the prospect such that the follow-up message is received by the prospect from the sponsor.

9. The method of claim 6 wherein the step of requesting prospect information includes prompting the sponsor to answer a series of survey questions based upon the sponsor's knowledge of the prospect.

10. The method of claim 6 further comprising the step of requesting the sponsor to answer survey questions to develop sponsor information.

11. The method of claim 6 further comprising the steps of:
determining whether the prospect has positively responded to the personalized web page;
analyzing the success rate of the personalized message based upon the prospect information received from the sponsor about the prospect; and
revising the personalized message for the prospect based upon the success rate for the group of similar prospects.

* * * * *